US005079436A

United States Patent [19]
Elkins

[11] Patent Number: 5,079,436
[45] Date of Patent: Jan. 7, 1992

[54] ANTI-THEFT EQUIPMENT

[75] Inventor: Robin K. Elkins, Hollywood, Fla.

[73] Assignee: State Paving Corporation, Fort Lauderdale, Fla.

[21] Appl. No.: 702,135

[22] Filed: May 13, 1991

Related U.S. Application Data

[63] Continuation of Ser. No. 419,322, Oct. 10, 1989, abandoned.

[51] Int. Cl.$^5$ .......................................... H01H 27/00
[52] U.S. Cl. ........................... 307/103; 307/10.2; 180/287
[58] Field of Search ............... 123/179 R, 179 B; 180/287; 307/10.2, 10.3, 10.4, 10.5

[56] References Cited

U.S. PATENT DOCUMENTS 4,192,400  3/1980  McEwan ........................ 180/287
4,479,064  10/1984  Monsen ......................... 307/10.4

Primary Examiner—A. D. Pellinen
Assistant Examiner—Jeffrey A. Gaffin
Attorney, Agent, or Firm—Joseph Zallen

[57] ABSTRACT

An anti-theft device for vehicles comprising a control circuit between the positive pole of the vehicle battery and the battery terminal of the solenoid of the starter. The control circuit comprises an SCR whose anode is connected to the positive pole and its cathode connected to the battery terminal of the solenoid. The control circuit is normally open and when closed by a detachable circuit key permits the battery positive pole to be now connected to the battery terminal.

6 Claims, 4 Drawing Sheets

ANTI-THEFT EQUIPMENT

This application is a continuation of the application Ser. No. 07/419,322 filed Oct. 10, 1989, abandoned.

This relates to anti-theft systems. In particular it relates to an anti-theft system for vehicles used in construction, such as bulldozers and graders which are often left locked but unguarded on construction sites. Such a vehicle is frequently subject to thieves by-passing the ignition to actuate the starter and thus start the engine.

PRIOR ART

Prior art on anti-theft equipment is found in Class 123, Sub-Classes 146.5 B, 179 B and 198 B and Class 307, Sub-Classes 10.2, 10.3, 10.4 and 10.5 in the classification system of the U.S. Patent and Trademark Office. Examples of prior art include electronic switching circuits, such as U.S. Pat. No. 3,492,494, to control the ignition circuit or the starter motor circuit, the switch being encapsulated to prevent tampering. However, such encapsulation alone is not sufficient to prevent destructive-minded thieves from determining how to energize the starter motor. In another example, U.S. Pat. No. 3,675,036, a silicon controlled rectifier (SCR) is used to short circuit the starting circuit of the ignition coil if there is no specified control signal. However, in diesel engines there are no ignition coils. Other prior art patents use circuits to control the relay of the solenoid of the starter. Also, various encoded electrical control systems have been employed, such as U.S. Pat. Nos. 4,141,332, 4,148,372, and 4,192,400.

Other examples of the prior art relate to housings covering the solenoid including an encoded circuit and various electronic encoding techniques in conjunction with SCRs which prevent relays from operating but which are not tamper-proof or are complex and costly to install or operate.

One object of the present invention is to provide an anti-theft system which is useful for electrically initialized equipment.

A further object of this invention is to provide an anti-theft system for vehicles used in construction.

A still further object of this invention is to provide such a system which provides improved protection against theft and is relatively inexpensive to install and operate.

Other objects of this invention will be apparent from the specification and claims taken together with the appended drawings.

SUMMARY OF INVENTION

Figure 1:
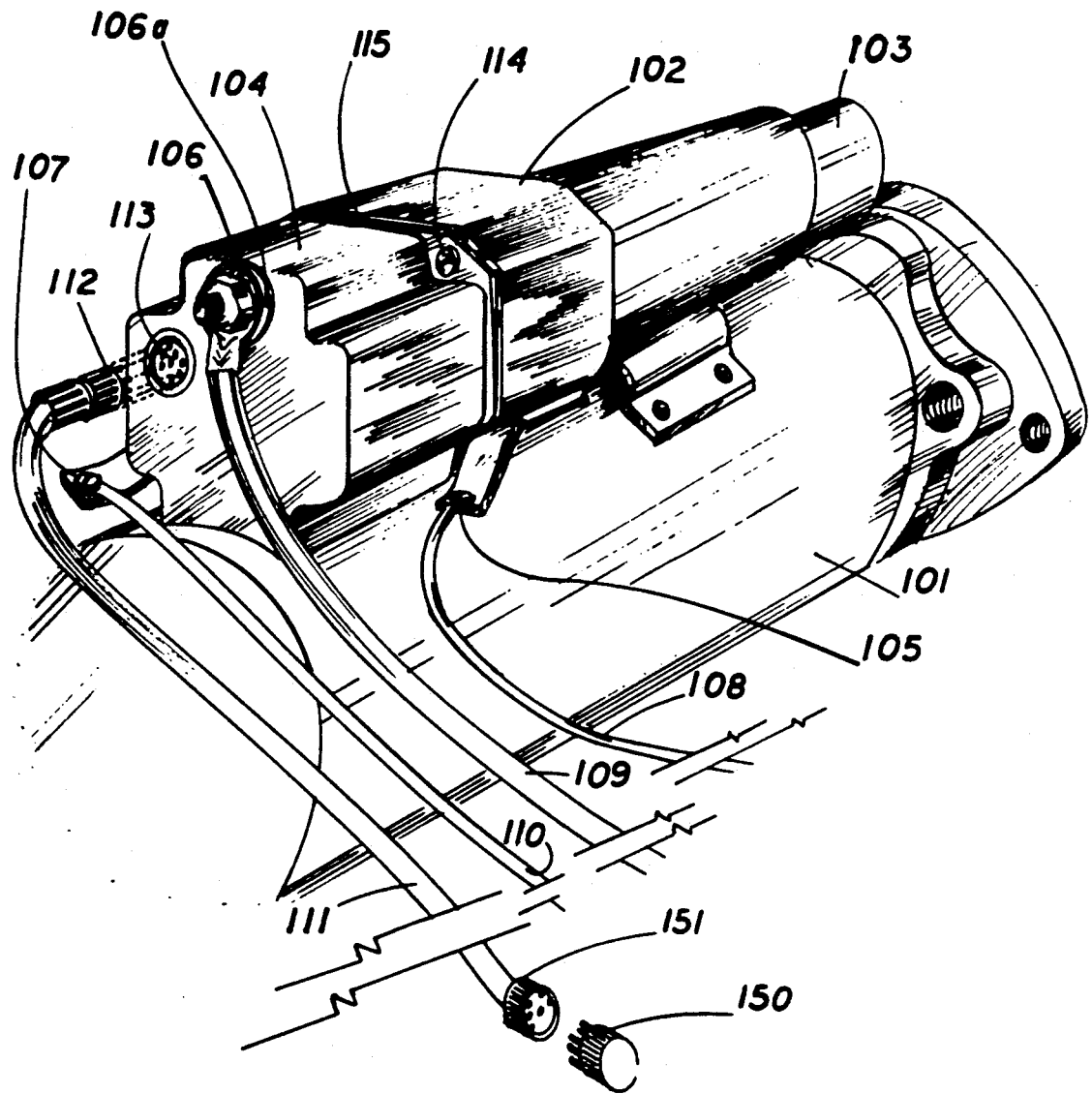
FIG. 1 is a perspective view of an embodiment of this invention shown attached to the solenoid of the starter of a grader used in construction.
Figure 3:
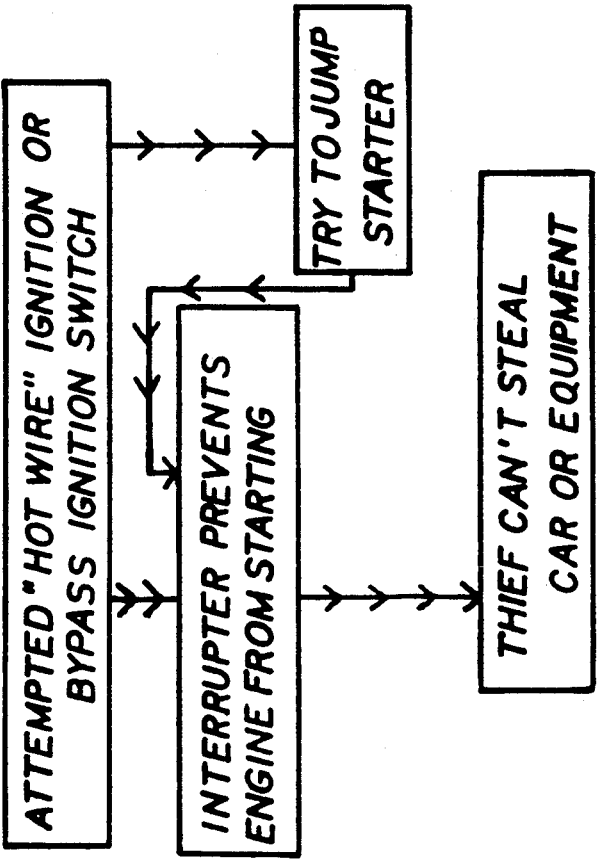
FIG. 3 is a diagrammatic explanation of what happens when there is an attempt to by-pass the starter.
Figure 2:
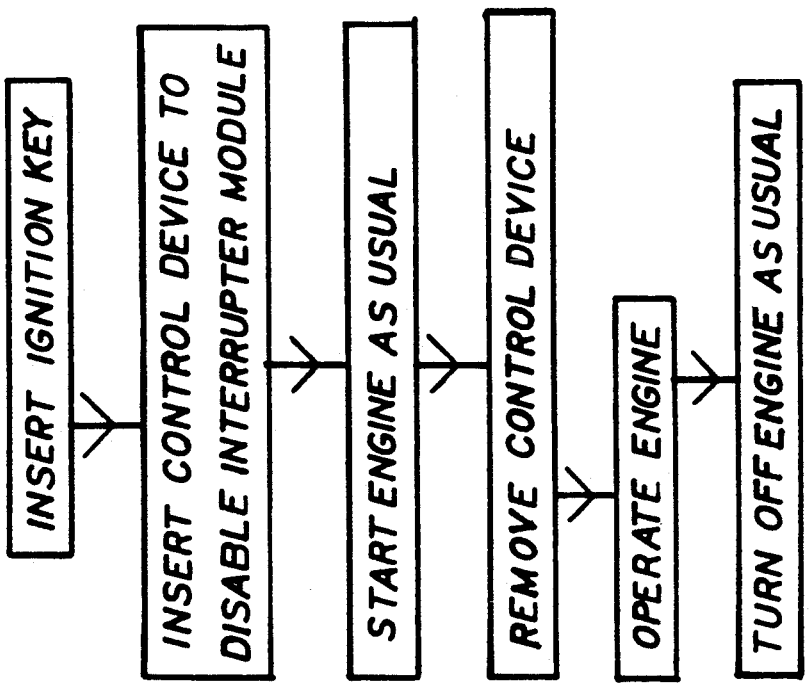
FIG. 2 is a diagrammatic explanation of operation of an engine utilizing this invention.

This invention provides a module for preventing unauthorized initiation and operation of equipment which requires a flow of starting current to the equipment to initiate its operation. The module is inserted in the circuit between the source of current and the equipment. It comprises a normally open control circuit and a key which when connected to the control circuit closes the circuit and permits the starting current to initiate the operation of the equipment. Once the equipment is operating, the key can be removed and the equipment will continue to operate. However, once the operation ceases, it can not be initiated without again connecting the key to close the control circuit. This invention is particularly applicable to equipment whose initiation of operation requires a high starting current, as, for example, in the range of 500 to 1500 amperes peak.

This invention has particular application to vehicles. A starter system for the engines of vehicles normally includes a starter switch, actuated by the operator, a source of electric current such as a battery (a solenoid, a starter motor and a pinion gear on the starter motor shaft which is engageable with the toothed rim of a flywheel. The flywheel rotates the engine shaft. When the starter switch is closed, the solenoid is energized causing the pinion gear to engage the flywheel and also energizing the starter motor causing the engine to be turned. When the engine fires, the operator releases the starter switch, and the solenoid and starter motor are deactivated.

The solenoid normally connects the high current power source to the starter motor which in turn causes connection of the pinion gear to the flywheel rim of the engine and connects the high-current power source to the starter motor. To prevent theft, the present invention contemplates providing an anti-theft control module between the high-current power source and the solenoid so that the circuit does not now directly connect the high current to the solenoid. The control module includes an open circuit and a key for closing the open circuit. The open circuit is characterized in that when it is closed by the key and the starter switch actuated, the high current power source is connected to the solenoid, which, in turn, energizes the starter motor. Once the engine is started, the starter switch released and the key removed from the circuit, the engine will continue running, but once stopped can not be restarted without reinsertion of the key.

The open circuit preferably comprises a silicon controlled rectifier (SCR) or an equivalent transistor circuit. Closing of the open circuit by the key gates the SCR which causes flow of the high current to the normal battery input terminal of the solenoid, thus permitting the starter motor to work. The key contains circuit means for closing the open circuit and re-opens the circuit when it is removed. In a preferred form of this invention the key has a group of pins which mate with sockets in the open circuit of the module. Only when the groups of pins and sockets are properly mated will the module circuit be closed. Some pins and sockets are deliberate shams to make it difficult to make or use a counterfeit key. In one form, the key comprises a cable connectable at one end to the open circuit module and at its other end connectable to a key completion module. The open circuit module is preferably housed in a theft-resistant housing securely attached to the solenoid housing of the starter to render the starter motor terminals inaccessible but connectable to the cable of the key.

Normally a thief would "hot wire" the source of electrical current directly to the starter motor, thus starting the engine without an ignition key. If a thief were to attempt the same process to steal the vehicle or equipment incorporating this present invention, the starter motor could not be made to work. The key can consist of a number of electronic components needed to properly close the control circuit, such as integrated circuits, discrete electronic equipment, opto-electronic equipment, or other equally or more sophisticated elements. These elements can be built into the key in a way that does not reveal their identity, such as removing part numbers from integrated circuits and encapsulation. For example, the key may contain an electronic memory that can be "reprogrammed" along with the control module at regular intervals, or at random intervals, to render any previously issued keys useless on that particular system.

SPECIFIC EXAMPLE OF THE INVENTION

Referring now to FIG. 1 of the drawings, a solenoid 102 is shown mounted in its normal manner on the starter motor housing 101 of a tractor. The housing 104 for the control module open circuit portion of this invention is attached to the solenoid 102 by plate and gasket 115 and special screws 114. Extending from open circuit portion 104 is a terminal 105 to which is connected an electrical conductor 108. Conductor 108 runs to the normal starter switch (not illustrated) of the engine. Terminal 107 is connected to ground by conductor 110. Terminal 106 mounted on insulator 106a connects to the open circuit 104. Terminal 106 is connected by heavy current conductor 109 to the positive terminal of the battery.

Figure 4:
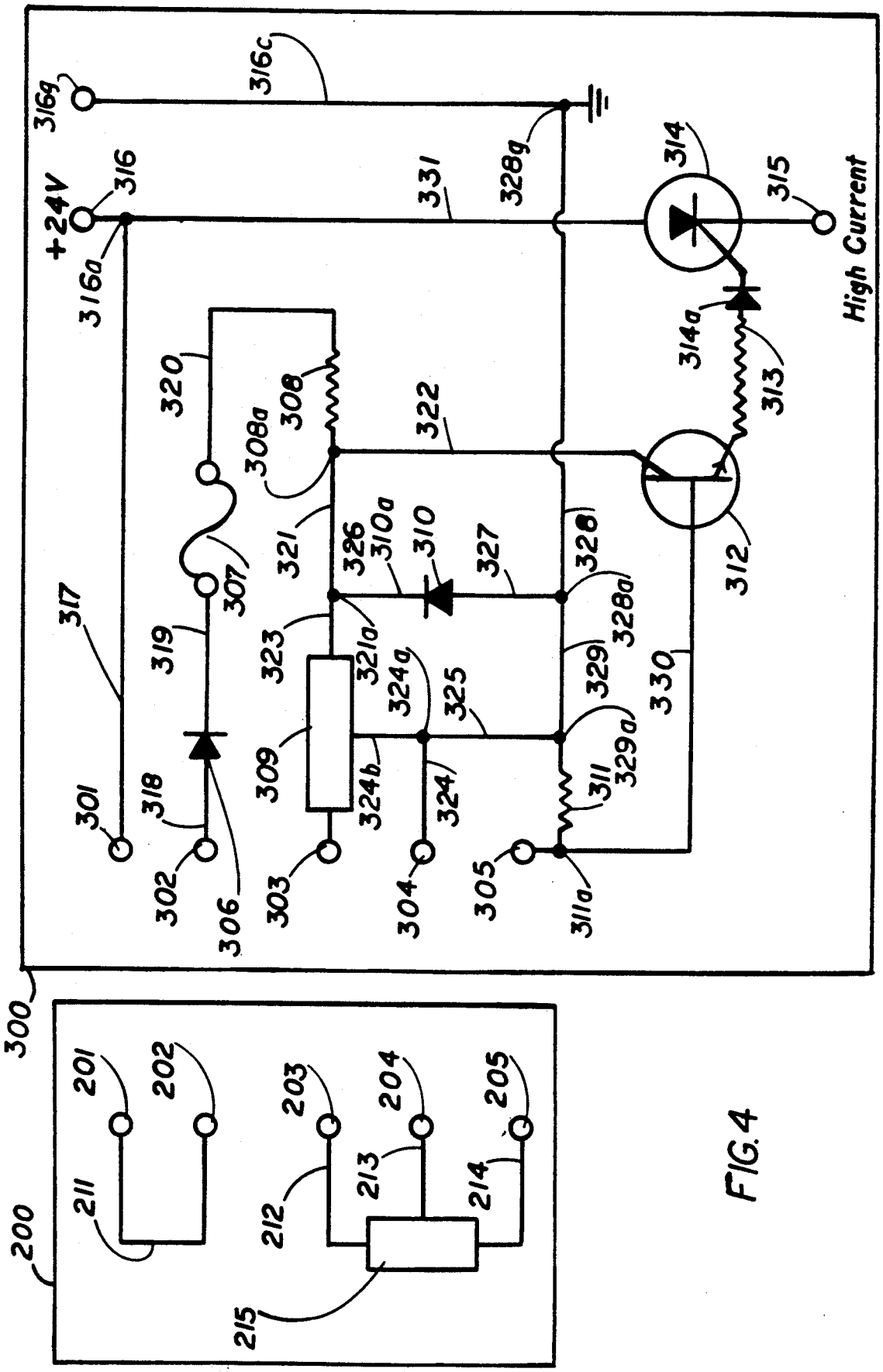
FIG. 4 is a diagrammatic representation of the circuit of an embodiment of this invention.

The back face of module housing 104 has a receptacle 113 with sockets and which is connected to control circuitry hidden within the module.(see FIG. 4). Switching cable 111 has a male end 112 with pins registrable with the sockets of receptacle 113. The other end of switching cable 111 leads to a hidden location where it terminates in a socketed receptacle 151 similar to 113. Actuation of the interrupter module requires that a key 150 having pins mate with the sockets of receptacle 151.

Figure 5:
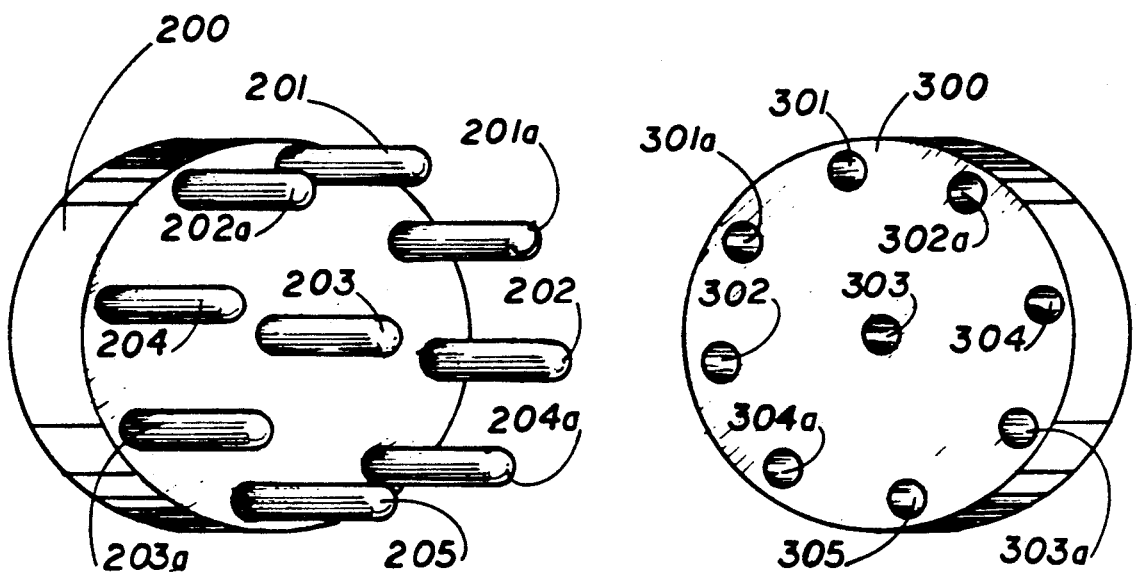
FIG. 5 is a diagrammatic representation of the cooperation of pins and sockets of the embodiment of FIG. 4.

In the embodiment illustrated in FIGS. 4 and 5 the open circuit 300 requires the key module 200 to complete the circuit. Pins 201 and 202 are connected to a jumper 211 and register with pins 301 and 302. A driver circuit is formed by conductors 212, IC voltage regulator 215 and conductors 213 and 214. Pins 203, 204 and 205 register with sockets 303, 304 and 305 in the open circuit module 300.

In the open circuit module the 24-volt battery positive pole is connected to terminal 316 from which it connects by conductor 317 to socket 301 and by conductor 331 to the input of silicon control rectifier (SCR) 314. When the key module 200 is connected with the open circuit module 300, the five pin and socket pairs 201-301; 202-302; 203-303; 204-304; and 205-305 are electrically connected. Three additional pairs of pins and sockets are formed, namely 201a-301a, 202a-302a, and 204a-304a, but these are shams and do not conduct. Current flows through conductors 317, jumper 211, diode 318, conductor 319, fuse 307, conductor 320, resistor 308, to terminal 308a. Terminal 308a is connected by conductor 322 to the collector of NPN transistor 312.

Conductor 321 leads from junction 308a to junction 321a. Connecting to junction 321a are conductors 323 and 310a. Conductor 323 connects to IC voltage regulator 309 whose output passes through pin-socket pair 203-303 through conductor 212 to IC voltage regulator 215. Voltage regulators 215 and 309 are powered through conductor 213, pin-socket pair 204-304, conductor 324, junction 321a and conductor 324b.

The output of voltage regulator 215 passes through conductor 214, pin-socket pair 205-305 to junction 311a. At junction 311a current flows through conductor 330 to the base of NPN transistor 312. The collector of series-regulator transistor 312 is connected by conductor 322 to junction 308a and its emitter current is fed through resistor 313 and diode 314a to the gate of silicon-controlled rectifier (SCR) 314.

Junction 311a is connected by resistor 311 to junction 329a where conductor 325 connects to junction 324a. From junction 329a conductor 329 leads to junction 328a from which conductor 327 leads to diode 310 and also via conductor 328 to junction 328b to ground. The output of diode 310 is fed by conductor 310a to junction 321a here it joins conductor 316c leading from the negative terminal 316g of the battery to ground.

The IC circuits serve to accurately control the voltage which is fed by transistor 312 to resistance 313, diode 314a and the gate of SCR 314. When the proper signal is applied to the gate high current is initiated through SCR 314 to the normal battery terminal 315 on the solenoid for the starter, thus energizing the solenoid to engage and fire the starter motor. With less than the proper signal voltage on the gate, the SCR will not conduct. With an excessive signal voltage, the fuse 307 will blow.

For purposes of illustration of the construction and operation of the invention, the key module 200 shows all the essential elements in one housing. However, as shown in FIG. 1 it is feasible to have the key module divided into several portions including a cable so that the various elements such as the IC voltage regulators 215 and 309 can be housed in various locations in the combination of the cable and key completer.

The IC voltage regulators 309 in the control module and 215 in the key module act to insure that the voltage is converted to a substantially stable low voltage, as for example 5 volts which is a safe voltage to use with the SCR. Examples of suitable regulators are three terminal positive voltage regulators with limits of 10 volts and 100 milliamperes, such as PANASONIC AN78L10. The transistor 312 drives the gate of the high-current handling SCR through a current-limiting resistor 313 and a protective diode 314a. The voltage at the base of transistor 312-is pulled down to zero until there is a completion of the circuit in the control module.

When the transistor 312 conducts and current is "passed" through the transistor 312, the voltage at the emitter will be the stable low voltage minus a 0.8 volt junction loss in the transistor. Since the transistor has gain, the transistor acts as an amplifier or regulator of the voltage it will output. This ensures that the voltage and current passed out of the transistor is very accurate, and always consistent. With less than the proper signal on the gate of the SCR [e.g. 3.0 volts, 150 milliamps], the SCR will not conduct any current through its main terminals. If the signal is in excess of the proper amount, the fuse 307 will blow.

In non-protected, ordinary equipment, high currents pass from the battery to the starter motor. This will only happen, however, when, and if, the starter motor relay is activated.

The amount of electrical current used by the key control and control circuit is very much less than the high current switched by the SCR. This difference is between 175 amps and 200 ∝ 250 milliamps, or about 1,000 to 1.

I claim:

1. In a vehicle having an engine, a high current electrical power source having a positive pole, such as a vechile battery, and starter means for the engine; said starter means including a starter switch, a starter motor which is mechanically connectable to the flywheel of the engine and a solenoid means characterized as having a battery terminal normally connected directly to said positive pole and which when energized normally connects said power source to said starter motor and causes said starter motor to engage the flywheel:

The improvement to prevent theft comprising control means inserted between said positive pole and said solenoid battery terminal, said control means including a normally open control circuit and key means for closing said circuit, said circuit being characterized in that when it is open no current flows from said positive pole to said solenoid battery terminal, said circuit being further characterized in that when it is closed by said key means actuation of said starter switch permits said positive pole to connect to said battery terminal of the solenoid means, thus energizing the solenoid to cause said starter motor to operate; said improvement being further characterized in that once said engine is started and said key means removed from said circuit thus opening the circuit, said engine will continue running, but once stopped cannot be re-started without re-closing of said open circuit by said key means, said improvement being additionally characterized in that while said circuit is open, movement of said solenoid means into engagement with said starter motor will not connect power to said starter motor.

2. The improvement of claim 1 further characterized in that said circuit has fuse means to protect said circuit, if excess signal is applied to the circuit.

3. The improvement of claim 1 wherein said open circuit means comprises SCR means and means for gating said SCR means to permit passage of current from said power source to said battery terminal of the solenoid means when said circuit is closed by said key means.

4. The improvement of claim 3, whenever said positive pole is connected to the anode of said SCR means and the cathode of said SCR means is connected to said battery terminal of the solenoid means.

5. The improvement of claim 1 wherein said key means comprises a cable connectable at one end to said circuit and at its other end to a key completion means.

6. The improvement of claim 1 wherein said control means is housed in a module which is attached to the housing of the solenoid.

* * * * *